United States Patent
Takahashi et al.

(10) Patent No.: US 6,294,150 B2
(45) Date of Patent: *Sep. 25, 2001

(54) HIGHLY HEAT RESISTANT β-ZEOLITE AND ABSORBENT FOR AUTOMOBILE EXHAUST GAS PURIFICATION AND ADSORBENT FOR AUTOMOBILE EXHAUST GAS PURIFICATION

(75) Inventors: Akira Takahashi, Ann Arbor, MI (US); Toshihiro Tomita, Nagoya (JP); Takuya Hiramatsu, Nagoya (JP); Kenji Suzuki, Nagoya (JP); Masahiko Matsukata, 1-16-1306, Miyuki-cho, Tokorozawa-city, Saitama-prefecture, 359-1115 (JP)

(73) Assignees: NGK Insulators, Ltd.; Masahiko Matsukata, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,005

(22) Filed: Nov. 6, 1998

(30) Foreign Application Priority Data

Nov. 7, 1997 (JP) .................................................. 9-322384

(51) Int. Cl.$^7$ .............................. C01B 39/46; B01J 29/70
(52) U.S. Cl. .................................. 423/716; 423/DIG. 27; 502/64
(58) Field of Search ........................... 423/716, DIG. 27; 502/64

(56) References Cited

U.S. PATENT DOCUMENTS

| | | | |
|---|---|---|---|
| 5,171,556 | * 12/1992 | Caullet et al. | 423/705 |
| 5,228,979 | * 7/1993 | Ward | 208/111 |
| 5,427,765 | * 6/1995 | Inoue et al. | 423/705 |
| 5,558,851 | * 9/1996 | Miller | 423/DIG. 27 |
| 5,853,566 | * 12/1998 | Kraushaar-Czarnetzki | 208/109 |
| 6,004,527 | * 12/1999 | Murrell et al. | 423/DIG. 27 |

FOREIGN PATENT DOCUMENTS

| | | |
|---|---|---|
| 0 419 334 | 3/1991 | (EP) . |
| 0 523 829 | 1/1993 | (EP) . |
| 0 593 898 | 4/1994 | (EP) . |
| 609 304-B | * 8/1994 | (EP) . |
| 0 614 853 | 9/1994 | (EP) . |
| 0 854 114 | 7/1998 | (EP) . |
| 2-75327 | 3/1990 | (JP) . |
| 4-293519 | 10/1992 | (JP) . |
| 6-63392 | 3/1994 | (JP) . |
| 9-99217 | 4/1997 | (JP) . |
| 9-175818 | 7/1997 | (JP) . |
| 94/11623 | 5/1994 | (WO) . |
| 94/26663 | 11/1994 | (WO) . |

OTHER PUBLICATIONS

Culity, Elements of X–Ray Diffraction, 1978, p. 100.*

* cited by examiner

Primary Examiner—David R Sample
(74) Attorney, Agent, or Firm—Burr & Brown (57) ABSTRACT

A highly heat-resistant and hydrothermal-resistant β-zeolite having a $SiO_2/Al_2O_3$ ratio of 80 or more, which is constituted by primary particles having an average particle diameter of 30 nm or more or by primary particles having such a particle size distribution that the 10% particle diameter is 20 nm or more; and an adsorbent for automobile exhaust gas purification, using said β-zeolite. The β-zeolite and the adsorbent can be produced reliably so as to have guaranteed properties.

7 Claims, 8 Drawing Sheets

HIGHLY HEAT RESISTANT β-ZEOLITE AND ABSORBENT FOR AUTOMOBILE EXHAUST GAS PURIFICATION AND ADSORBENT FOR AUTOMOBILE EXHAUST GAS PURIFICATION

BACKGROUND OF THE INVENTION

1. Field of the Invention

The present invention relates to a highly heat-resistant and hydrothermal-resistant β-zeolite and an adsorbent for automobile exhaust gas purification using the β-zeolite.

2. Description of the Related Art

In order for a catalyst (used for purification of the exhaust gas emitted from an automobile or the like) to exhibit its catalytic activity, the catalyst must be heated to an activation temperature or higher by, for example, the heat of the exhaust gas. When the temperature of the exhaust gas is low as in the cold start of an engine, the harmful substances in the exhaust gas, such as hydrocarbons (HC), carbon monoxide (CO) and nitrogen oxides (NOx) are hardly purified. The purification of, in particular, HC which is discharged in a large amount during the cold start of an engine, is an important task to be achieved.

In order to improve the efficiency of HC purification during the cold start, there are known techniques of using, as an HC adsorbent, a molecular sieve made of a crystalline aluminosilicate such as zeolite or the like and allowing the adsorbent to adsorb HC while a catalyst used together reaches its activation temperature.

For example, in Japanese Patent Application Kokai (Laid-Open) No. 75327/1990 is disclosed an apparatus for automobile exhaust gas purification, using a Y type zeolite or mordenite as an HC adsorbent. Also in Japanese Patent Application Kokai (Laid-Open) No. 293519/1992 is disclosed use of an HC adsorbent obtained by subjecting a $H^+$/ZSM-5 zeolite to ion exchange with Cu and Pd, in order to alleviate the adverse effect of water adsorption, attain improved HC adsorption capability, and widen the temperature range for HC adsorption. For the same purpose, use, as an HC adsorbent, of a pentasil type metallosilicate subjected to ion exchange with H, Cu or Pd is proposed in Japanese Patent Application Kokai (Laid-Open) No. 63392/1994.

Further in Japanese Patent Application Kokai (Laid-Open) No. 99217/1997 is proposed use, as an HC adsorbent, of an $H^+$/β-zeolite having a $SiO_2/Al_2O_3$ ratio of 100 or more, superior in HC adsorption capability and capable of maintaining its pore structure even when subjected to an exhaust gas of 750° C. or higher.

The $SiO_2/Al_2O_3$ ratio indicative of the composition of zeolite framework and/or the ion (e.g. $H^+$, $Na^+$ or $Cu^{2+}$) presence close to the Al of zeolite framework for electric charge compensation, which as the yardstick for the heat resistance of zeolite, have heretofore been used mainly.

It was discovered, however, that two zeolites having the same $SiO_2/Al_2O_3$ ratio or the same ion have greatly different heat resistances when they are produced from different raw materials or different processes.

When a zeolite insufficient in heat resistance, particularly hydrothermal resistance (e.g. heat resistance in automobile exhaust gas) is used for purification of the exhaust gas emitted from an internal combustion engine of an automobile or the like, the pore structure of the zeolite is gradually collapsed; therefore, such it is found that a zeolite will deteriorate in purifiability when used in a high temperature exhaust gas such as emitted during continuous high-speed engine operation or the like.

Also, when such a zeolite is used in a catalyst and subjected to a heating and regeneration treatment for removal of formed coke or the like, there have been cases that the pore structure of the zeolite is impaired.

Thus, it has been a task how to define a highly heat-resistant and hydrothermal-resistant zeolite by its properties and produce such a zeolite.

SUMMARY OF THE INVENTION

In view of the above-mentioned problems of the prior art, the present inventors made an intensive study on the properties of zeolite relating to the heat resistance of zeolite. As a result, the present inventors discovered that the heat resistance of a zeolite has close relations with the average particle diameter, particle size distribution and particle shape of particles constituting the zeolite, and/or with the crystal structure of the zeolite. The finding has led to the completion of the present invention.

According to the present invention, there is provided, as a first invention, a highly heat-resistant β-zeolite having a $SiO_2/Al_2O_3$ ratio of 80 or more, which is constituted by primary particles having an average particle diameter of 30 nm or more.

The highly heat-resistant β-zeolite is preferably constituted by primary particles having an average particle diameter of 50 nm or more, more preferably by primary particles having an average particle diameter of 80 nm or more.

According to the present invention, there is also provided, as a second invention, a highly heat-resistant β-zeolite having a $SiO_2/Al_2O_3$ ratio of 80 or more, which is constituted by primary particles having such a particle size distribution that the 10% particle diameter is 20 nm or more.

The highly heat-resistant β-zeolite is preferably constituted by primary particles having such a particle size distribution that the 10% particle diameter is 40 nm or more.

According to the present invention, there is also provided, as a third invention, a highly heat-resistant β-zeolite having a $SiO_2/Al_2O_3$ ratio of 80 or more, which is constituted by primary particles having at least one angular portion.

According to the present invention, there is also provided, as a fourth invention, a highly heat-resistant β-zeolite having a $SiO_2/Al_2O_3$ ratio of 80 or more, which is constituted by particles giving a full width at half maximum (FWHM) in X-ray diffraction pattern at (h,k,l)=(3,0,2), of $2\theta=0.5°$ or smaller when the X-ray diffraction pattern is obtained from an X-ray diffractometer using Cu=Kα as the X-ray source.

Generally, a heat-resistant zeolite having crystallinity shows a sharp X-ray diffraction pattern. In the pattern, crystallinity was determined by the use of full width at half maximum of reflection peak for (h,k,l)=(3,0,2).

Preferably, the highly heat-resistant β-zeolite of the present invention has at least two elements of the above-mentioned particular primary particle diameter, particular particle size distribution, particular particle shape and particular X-ray diffraction pattern (crystal structure).

According to the present invention, there is also provided an adsorbent for automobile exhaust gas purification, comprising any of the above-mentioned highly heat-resistant β-zeolites.

DETAILED DESCRIPTION OF THE INVENTION

In the β-zeolite of the present invention, each of the primary particle diameter, the particle size distribution, the particle shape and the X-ray diffraction pattern (crystal structure) is selected to be in a particular range and, as a result, the present β-zeolite has excellent heat resistance and can be produced reliably. Therefore, the present β-zeolite can be suitably used in applications where high heat resistance and high hydrothermal resistance are required, such as hydrocarbon adsorption, exhaust gas purification system for an internal combustion engine (e.g. in-line type exhaust gas purification system) and the like.

The present invention is hereinafter described in detail.

The β-zeolite of the first invention has a $SiO_2/Al_2O_3$ ratio of 80 or more and is constituted by primary particles having an average particle diameter of 30 nm or more, preferably 50 nm or more. In the present invention, "average particle diameter" refers to a 50% particle diameter which, when 100 or more primary particles are randomly selected and measured for their dimensions by the use of a scanning electron microscope (SEM) or transmission electron microscope (TEM), is a diameter of a particle falling at the 50% position in number of particles.

The reason for specifying a $SiO_2/Al_2O_3$ ratio of 80 or more is that the adverse effect on the heat resistance of β-zeolite, given by a $SiO_2/Al_2O_3$ ratio of less than 80 is far larger than the favorable effect thereon given by the abovespecified average particle diameter. In other words, the particle diameter and crystal structure of β-zeolite have large effects on the heat resistance of β-zeolite only when the β-zeolite has a $SiO_2/Al_2O_3$ ratio of 80 or more.

The reason why the average particle diameter specified by the present invention has a favorable effect on the heat resistance of β-zeolite, is not clear. However, it is presumed that when the primary particles of β-zeolite are allowed to have a particle diameter of 30 nm or more, the particles have a small external surface area per unit weight and are less affected by water (which acts so as to accelerate the structural destruction of zeolite), whereby the particles have high heat resistance and hydrothermal resistance.

The β-zeolite of the second invention has a $SiO_2/Al_2O_3$ ratio of 80 or more and is constituted by primary particles having such a particle size distribution that the 10% particle diameter is 20 nm or more, preferably 40 nm or more.

By allowing the primary particles to have such a particle size distribution that the 10% particle diameter is 20 nm or more, it is possible to reduce the number of primary particles having a small particle diameter and low heat resistance.

The β-zeolite of the third invention has a $SiO_2/Al_2O_3$ ratio of 80 or more and is constituted by primary particles having at least one angular portion.

A β-zeolite constituted by primary particles having at least one angular portion is preferred because the presence of such primary particles is presumed to improve the particle growth during crystallization.

The β-zeolite of the fourth invention has a $SiO_2/Al_2O_3$ ratio of 80 or more and is constituted by particles giving a full width at half maximum of reflection peak for (h,k,l)=(3,0,2), of 2θ=0.5° or smaller when the X-ray diffraction pattern is obtained from an X-ray diffractometer using Cu=Kα as the X-ray source.

Generally, a heat-resistant zeolite having crystallinity shows a sharp X-ray diffraction pattern. In the pattern, crystallinity was determined by the use of full width at half maximum of reflection peak for (h,k,l)=(3,0,2).

In general, the full width at half maximum of X-ray diffraction pattern is affected by three parameters, i.e. a parameter associated with the size of crystal grain, a parameter associated with crystallinity (e.g. lattice strain), and a parameter inherent to diffractometer (a diffractometer constant). The full width at half maximum in the fourth invention is affected by parameters including the diffractometer constant. Since the diffractometer constant is determined by the main parameters of diffractometer, the parameters of the X-ray diffractometer used for measurement of the full width at half maximum specified in the fourth invention are shown below.

1. Goniometer radius: 185 mm
2. Slit
   DS (divergence slit)=SS (scattering slit)=1°
   RS (receiving slit)=0.3 mm
3. Graphite-curved monochrometer was used.
4. Target: Cu
5. Measurement conditions
   Scanning speed: 2θ=1/4°/min
   Accelerating voltage: 35 kV
   Current: 20 mA
6. Cu=Kd$_1$ and Cu=Kd$_2$ were separated from each other, and full width at half maximum was calculated from Cu=Kd$_1$.

When the sizes of primary particles are 100 nm or smaller, the full width at half maximum is affected by a parameter associated with the size of crystal grain as mentioned above; in this case, therefore, the full width at half maximum is affected by three parameters, i.e. a diffractometer constant, a parameter associated with the size of crystal grain, and a parameter associated with crystallinity (e.g. lattice strain). Hence, it is presumed that when the diameters of primary particles are 100 nm or smaller, the full width at half maximum of X-ray diffraction pattern is small (full width at half maximum of reflection peak for (k,h,l)=(3,0,2), of $2\theta=0.5°$ or smaller), the particle diameter is relatively large or the crystallinity of particle is good and, as a result, high heat resistance is obtained. When the sizes of primary particles are 100 nm or larger, the full width at half maximum is not affected by the ago size of crystal grain and is affected by a parameter associated with crystallinity and a diffractometer constant. It is presumed that when the diameters of primary particles are 100 nm or larger, the full width at half maximum of X-ray diffraction pattern is small (full width at half maximum of reflection peak for (k,h,l)=(3,0,2), of $2\theta=0.5°$ or smaller), the crystallinity of particle is good and, as a result, high heat resistance is obtained.

Next, description is made on the process for production of the highly heat-resistant β-zeolite of the present invention.

In general, β-zeolite is obtained by adding, to a silica solution or gel, Al and a template such as tetraethylammonium cation (TEA cation) or the like and subjecting the mixture to a hydrothermal treatment using an autoclave or the like to give rise to crystallization. Further, filtration, washing with water, drying, TEA removal and calcination are conducted to obtain usable β-zeolite. When the obtained β-zeolite has a low $SiO_2/Al_2O_3$ ratio, it is subjected to an Al-removing treatment (e.g. an acid treatment, or a steam treatment at a high temperature) to increase the $SiO_2/Al_2O_3$ ratio.

In order to obtain a highly heat-resistant A-zeolite whose average particle diameter or particle size distribution is in the above-mentioned particular range, it is preferred to control the hydrothermal treatment for crystallization, mentioned in the above production process. As to the method for controlling the hydrothermal treatment for crystallization, there are various methods and there is no particular restriction. Examples thereof include (1) a method of reducing the gel concentration or adding a nucleus formation-suppressing agent (e.g. triethanolamine) to reduce the number of nuclei formed, and (2) a method of extending the time of the hydrothermal treatment to extend the time for crystal growth. The hydrothermal treatment for crystallization can also be controlled by using two or more kinds of silica source in nucleus formation and crystal growth timing.

In order to obtain a highly heat-resistant β-zeolite whose particle shape is as specified above or whose full width at half maximum of X-ray diffraction pattern is in the above-mentioned particular range, there is employed, for example, a method of increasing the concentration of TEA (used as a template) or the like.

The highly heat-resistant β-zeolite of the present invention can also be obtained by a process which comprises adding, to a Si source (e.g. colloidal silica), an aqueous sodium hydroxide solution, tetraethylammonium hydroxide (TEAOH) and an Al source (e.g. aluminum sulfate), heating the resulting mixture with stirring until a completely dried gel is obtained, feeding the dried gel into an autoclave so that the gel and water are separated, and conducting a hydrothermal treatment at a temperature of about 180° C. for several hours to several hundreds hours. In this hydrothermal treatment as well, various parameters such as temperature, time and the like must be controlled.

The present invention is hereinafter described in detail with reference to Examples. However, the present invention is in no way restricted to these Examples.

The highly heat-resistant $H^+$/β-zeolites obtained in Examples were evaluated for performances according to the following methods.

Observation of Particle Form and Measurement of Particle Size Distribution

Particle size and particle shape were observed using a field emission gun type high resolution scanning electron microscope (FE-SEM) (JSM-890, a product of Nihon Denshi K. K.) and a transmission electron microscope (TEM) (JEM-2010, a product of Nihon Denshi K. K.).

The accelerating voltage used during FE-SEM observation was 10 kV. During TEM observation, the accelerating voltage was 200 kV and, in order to determine whether or not each observed particle was a single crystal, electron diffraction was conducted at a camera length of 100 cm.

When the electron diffraction image of a whole particle showed a spotly periodic regular pattern, the particles were judged to be primary particles (a single crystal); for other cases, the particles were judged to be aggregated particles.

Particle size distribution was determined by using 200 particles randomly selected from the photograph (observed image) of FE-SEM or TEM and measuring the maximum size on the photograph.

Measurement of Full Width at Half Maximum of Reflection Peak for (h,k,l)=(3,0,2)

Using an X-ray diffractometer (RAD-IB, a product of Rigaku Denki K. K.), powder X-ray diffractometry was conducted using Cu=Kα as an X-ray source. From the X-ray diffraction pattern obtained, the full width at half maximum at a peak in the vicinity of $2\theta=22°$ was calculated. The peak shows (h,k,l)=(3,0,2), and it is the main peak of β-zeolite. Crystallinity was determined by the use of the full width at half maximum at this peak. Incidentally, during the measurement, the accelerating voltage was 35 kV and the current was 20 mA. As a slit system, there were used a divergence slit (DS) 1°, a scattering slit (SS) 1°, and a receiving slit (RS) 0.3 mm. All but CuKα was removed by the use of a curved monochromator. Prior to the calculation of full width at half maximum, $Cu=Kd_1$ was separated form $Cu=Kd_2$, and full width at half maximum was obtained from $Cu=Kd_1$. The ratio of $Cu-Kd_2/Cu-Kd_1$ was 0.49.

Evaluation of Heat Resistance

A highly heat-resistant $H^+$/β-zeolite powder was subjected to a durability test by placing it on an alumina-made boat, transferring the boat into an electric furnace, and exposing the boat to an atmosphere containing 10% of steam, at 1,000° C. for 4 hours. The specific surface areas of the powder before and after the durability test were measured. The specific surface area after the durability test was divided by the specific surface area before the durability test to calculate the retention (%) of specific surface area, which was taken as the heat resistance of the β-zeolite powder.

EXAMPLE 1

An aqueous sodium hydroxide solution was added to colloidal silica (30% by weight). To the resulting mixture was added a solution obtained by mixing aluminum nitrate nonahydrate $[Al(NO_3)_3.9H_2O]$ with an aqueous solution of 35% by weight of tetraethylammonium hydroxide (TEAOH). The resulting mixture was stirred until it became homogeneous, to obtain a final mixture. The final mixture had the following composition.

$$21Na_2O.10Al_2O_3.300SiO_2.150TEAOH.4000H_2O$$

The mixture was placed in a TEFLON (tetrafluorethylene) container. The container was placed in an autoclave and heated at 135° C. for 7 days at autogenous pressure. Then, the contents in the container were subjected to centrifugation to obtain a solid reaction product. The product was separated, washed, dried at 80° C. and heat-treated in air at 540° C. for 4 hours to remove the template. The powder obtained was subjected to a steam treatment (650° C. and 5 hours) and a leaching treatment in 1N aqueous hydrochloric acid solution. A series of these two treatments were conducted three times. The resulting powder was treated in an aqueous ammonium nitrate solution at 80° C. for 1 hour for the purpose of ion exchange. Then, separation, washing, drying and calcination were conducted to obtain a highly heat-resistant $H^+/\beta$-zeolite.

EXAMPLE 2

An aqueous sodium hydroxide solution was added to colloidal silica (30 by weight). To the resulting mixture was added a solution obtained by mixing iron (III) nitrate nonahydrate $[Fe(NO_3)_3.9H_2O]$ and aluminum nitrate nonahydrate $[Al(NO_3)_3.9H_2O]$ with an aqueous solution of 35% by weight of tetraethylammonium hydroxide (TEAOH). The resulting mixture was stirred until it became homogeneous, to obtain a final mixture. The final mixture had the following composition.

$$21Na_2O.Al_2O_3.6Fe_2O_3.300SiO_2.150TEAOH.6200H_2O$$

The mixture was placed in a TEFLON (tetrafluoroethylene) container. The container was placed in an autoclave and heated at 135° C. for 8 days at autogenous pressure. Then, the contents in the container were subjected to centrifugation to obtain a solid reaction product. The product was separated, washed, dried at 80° C. and heat-treated in air at 540° C. for 4 hours to remove the template. The resulting powder was treated in an aqueous ammonium nitrate solution at 80° C. for 1 hour for the purpose of ion exchange. Then, separation, washing, drying and calcination were conducted to obtain a highly heat-resistant $H^+/\beta$-zeolite.

EXAMPLE 3

An aqueous sodium hydroxide solution was added to colloidal silica (30% by weight). To the resulting mixture was added a solution obtained by mixing aluminum nitrate nonahydrate $[Al(NO_3)_3.9H_2O]$ with an aqueous solution of 35% by weight of tetraethylammonium hydroxide (TEAOH). The resulting mixture was stirred until it became homogeneous, to obtain a final mixture. The final mixture had the following composition.

$$21Na_2O.8Al_2O_3.300SiO_2.150TEAOH.3200H_2O$$

The mixture was placed in a TEFLON (tetrafluoroethylene) container. The container was placed in an autoclave and heated at 135° C. for 6 days at autogenous pressure. Then, the contents in the container were subjected to centrifugation to obtain a solid reaction product. The product was separated, washed, dried at 80° C. and heat-treated in air at 540° C. for 4 hours to remove the template. The powder obtained was subjected to a steam treatment (650° C. and 5 hours) and a leaching treatment in 1N aqueous hydrochloric acid solution. A series of these two treatments were conducted three times. The resulting powder was treated in an aqueous ammonium nitrate solution at 80° C. for 1 hour for the purpose of ion exchange. Then, separation, washing, drying and calcination were conducted to obtain a highly heat-resistant $H^+/\beta$-zeolite.

EXAMPLE 4

An aqueous sodium hydroxide solution and an aqueous solution of 35% by weight of tetraethylammonium hydroxide (TEAOH) were added to colloidal silica (30% by weight), and they were stirred at room temperature. To the resulting mixture was added an aqueous solution of aluminum sulfate, and the resulting mixture was stirred and heated up to 80° C. The mixture was further stirred until a gel is dried to obtain a dried gel for crystallization. The dried gel had the following composition.

$$10Na_2O.Al_2O_3.200SiO_2.75TEAOH.500H_2O$$

The dried gel was sufficiently ground and then placed in an autoclave to be subjected to steam treatment at 180° C. for 16 hours at autogenous pressure. In the steam treatment, the dried gel was separated from water, placed in the autoclave, and heated in a closed container. Then, the products in the container were washed with water, subjected to centrifugation, subjected to washing, dried at 80° C., and heat-treated in air at 540° C. for 4 hours to remove the template. The resulting powder was treated in an aqueous ammonium nitrate solution at 80° C. for 1 hour for the purpose of ion exchange. Then, separation, washing, drying and calcination were conducted to obtain a $H^+/\beta$-zeolite molecule sieve.

EXAMPLE 5

An aqueous sodium hydroxide solution and an aqueous solution of 35% by weight of tetraethylammonium hydroxide (TEAOH) were added to colloidal silica (30% by weight), and they were stirred at room temperature. To the resulting mixture was added an aqueous solution of aluminum sulfate, and the resulting mixture was stirred and heated up to 80° C. The mixture was stirred until a viscosity of the gel rose, and then transferred to a kneader (K-1 type produced by Neotech K. K.). The mixture was further kneaded at 80° C. until the gel was dried to obtain a dried gel for crystallization. The dried gel had the following composition.

$$10Na_2O.Al_2O_3.300SiO_2.110TEAOH.320H_2O$$

The dried gel was sufficiently ground and then placed in an autoclave to be subjected to steam treatment at 180° C. for 16 hours at autogenous pressure. In the steam treatment, the dried gel was separated from water, placed in the autoclave, and heated in a closed container. Then, the products in the container were washed with water, subjected to centrifugation, subjected to washing, dried at 80° C., and heat-treated in air at 540° C. for 4 hours to remove the template. The resulting powder was treated in an aqueous ammonium nitrate solution at 80° C. for 1 hour for the purpose of ion exchange. Then, separation, washing, drying and calcination were conducted to obtain a $H^+/\beta$-zeolite molecule sieve.

EXAMPLE 6

Colloidal silica (30% by weight) and an aqueous sodium hydroxide solution were added to a solution obtained by mixing an aqueous solution of aluminum sulfate to an aqueous solution of 35% by weight of tetraethylammonium hydroxide (TEAOH) to obtain a mixture. The mixture was stirred to obtain a reacted mixture. The reacted mixture was heated up to 80° C. and stirred until a viscosity of the gel rose, and then transferred to a kneader (K-1 type produced by Neotech K. K.). The mixture was further kneaded until the gel was dried to obtain a dried gel for crystallization. The dried gel had the following composition.

$10Na_2O.Al_2O_3.300SiO_2.110TEAOH.770H_2O$

The dried gel was sufficiently ground and then placed in an autoclave to be subjected to steam treatment at 180° C. for 16 hours at autogenous pressure. In the steam treatment, the dried gel was separated from water, placed in the autoclave, and heated in a closed container. Then, the products in the container were washed with water, subjected to centrifugation, subjected to washing, dried at 80° C., and heat-treated in air at 540° C. for 4 hours to remove the template. The resulting powder was treated in an aqueous ammonium nitrate solution at 80° C. for 1 hour for the purpose of ion exchange. Then, separation, washing, drying and calcination were conducted to obtain a $H^+/\beta$-zeolite molecule sieve.

COMPARATIVE EXAMPLE 1

An aqueous sodium hydroxide solution was added to colloidal silica (30% by weight). To the resulting mixture was added a solution obtained by mixing aluminum nitrate nonahydrate $[Al(NO_3)_3.9H_2O]$ with an aqueous solution of 35% by weight of tetraethylammonium hydroxide (TEAOH). The resulting mixture was stirred until it became homogeneous, to obtain a final mixture. The final mixture had the following composition.

$21Na_2O.10Al_2O_3.300SiO_2.100TEAOH.2000H_2O$

The mixture was placed in a teflon container. The container was placed in an autoclave and heated at 135° C. for 5 days at autogenous pressure. Then, the contents in the container were subjected to centrifugation to obtain a solid reaction product. The product was separated, washed, dried at 80° C. and heat-treated in air at 540° C. for 4 hours to remove the template. The powder obtained was subjected to a steam treatment (650° C. and 5 hours) and a leaching treatment in 1N aqueous hydrochloric acid solution. A series of these two treatments were conducted three times. The resulting powder was treated in an aqueous ammonium nitrate solution at 80° C. for 1 hour for the purpose of to ion exchange. Then, separation, washing, drying and calcination were conducted to obtain a highly heat-resistant $H^+/\beta$-zeolite.

COMPARATIVE EXAMPLE 2

An aqueous sodium hydroxide solution was added to colloidal silica (30% by weight). To the resulting mixture was added a solution obtained by mixing aluminum nitrate nonahydrate $[Al(NO_3)_3.9H_2O]$ with an aqueous solution of 35% by weight of tetraethylammonium hydroxide (TEAOH). The resulting mixture was stirred until it became homogeneous, to obtain a final mixture. The final mixture had the following composition.

$21Na_2O.10Al_2O_3.300SiO_2.150TEAOH.4000H_2O$

The mixture was placed in a TEFLON (tetrafluoroethylene) container. The container was placed in an autoclave and heated at 130° C. for 7 days at autogenous pressure. Then, the contents in the container were subjected to centrifugation to obtain a solid reaction product. The product was separated, washed, dried at 80° C. and heat-treated in air at 540° C. for 4 hours to remove the template. The powder obtained was subjected to a steam treatment (650° C. and 5 hours) and a leaching treatment in 1N aqueous hydrochloric acid solution. A series of these two treatments were conducted three times. The resulting powder was treated in an aqueous ammonium nitrate solution at 80° C. for 1 hour for the purpose of ion exchange. Then, separation, washing, drying and calcination were conducted to obtain a highly heat-resistant $H^+/\beta$-zeolite.

For the highly heat-resistant $H^+/\beta$-zeolites obtained in Examples 1 to 6 and Comparative Examples 1 to 2, the particle forms were observed and the particle size distributions were measured. The results are shown in FIGS. 1 to 16 and Table 1.

TABLE 1

| | Particle size distribution | | |
|---|---|---|---|
| | 10% particle diameter (nm) | 50% particle diameter (nm) | 90% particle diameter (nm) |
| Example 1 | 39 | 65 | 87 |
| Example 2 | 83 | 220 | 282 |
| Example 3 | 18 | 40 | 62 |
| Example 4 | 76 | 96 | 120 |
| Example 5 | 72 | 98 | 118 |
| Example 6 | 180 | 224 | 263 |
| Comparative Example 1 | 9 | 18 | 23 |
| Comparative Example 2 | 12 | 23 | 34 |

Also for the highly heat-resistant $H^+/\beta$-zeolite obtained in Examples 1 to 6 and Comparative Examples 1 to 2, the full width of half maximum of X-ray diffraction pattern were measured and the heat resistances were evaluated. The results are shown in Table 2.

TABLE 2

| | | | Specific surface area | | |
|---|---|---|---|---|---|
| | $SiO_2/Al_2O_3$ ratio | FWHM of reflection peak for (h,k,l) = (3,0,2) | Before durability test $(m^2/g)$ | After durability test $(m^2/g)$ | Retention (%) |
| Ex. 1 | 120 | 0.259 | 630 | 390 | 62 |
| Ex. 2 | 130 | 0.278 | 610 | 430 | 70 |
| Ex. 3 | 110 | 0.523 | 630 | 370 | 59 |
| Ex. 4 | 200 | 0.332 | 520 | 380 | 73 |
| Ex. 5 | 300 | 0.235 | 470 | 390 | 83 |
| Ex. 6 | 300 | 0.188 | 520 | 440 | 85 |
| Comp. Ex. 1 | 120 | 0.623 | 620 | 270 | 44 |
| Comp. Ex. 2 | 150 | 0.659 | 590 | 290 | 49 |

FWHM (= full width at half maximum)

Discussion on Results of Examples 1 to 6 and Comparative Examples 1 to 2

Figure 3:
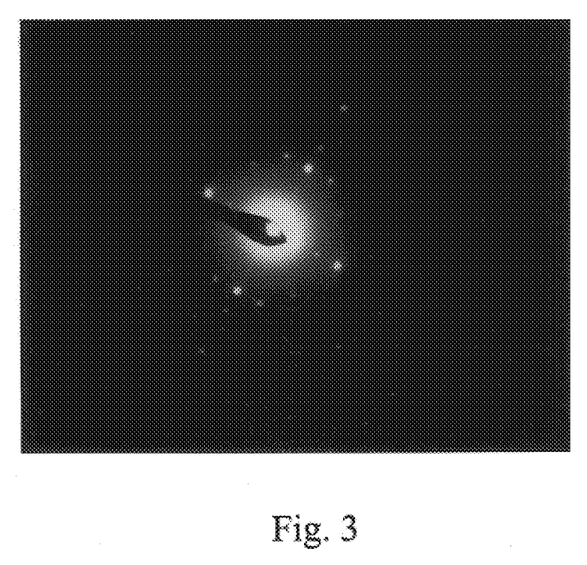
FIG. 3 is an electron diffraction photograph showing the particle structure of the highly heat-resistant β-zeolite of Example 1.
Figure 16:
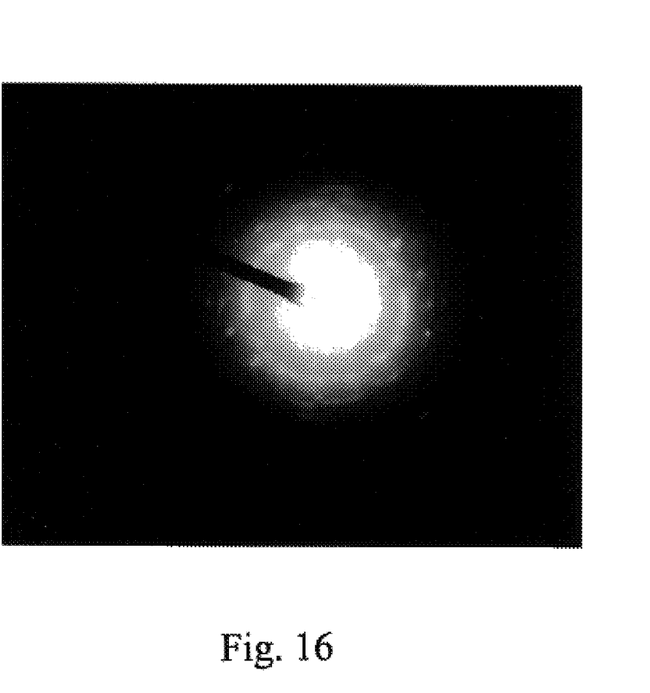
FIG. 16 is an electron diffraction photograph showing the particle structure of the highly heat-resistant β-zeolite of Comparative Example 1.

In the highly heat-resistant $\beta$-zeolite of Example 1, the electron diffraction image of whole particles shows a periodic regular pattern in FIG. 3 and, therefore, each particle observed is a primary particle (a single crystal). Meanwhile, in the $\beta$-zeolite of Comparative Example 1, the electron diffraction image shows no regular pattern as seen in FIG. 16 and, therefore, the particles are judged to be aggregates of particles of 10 to 30 nm in size.

Figure 1:
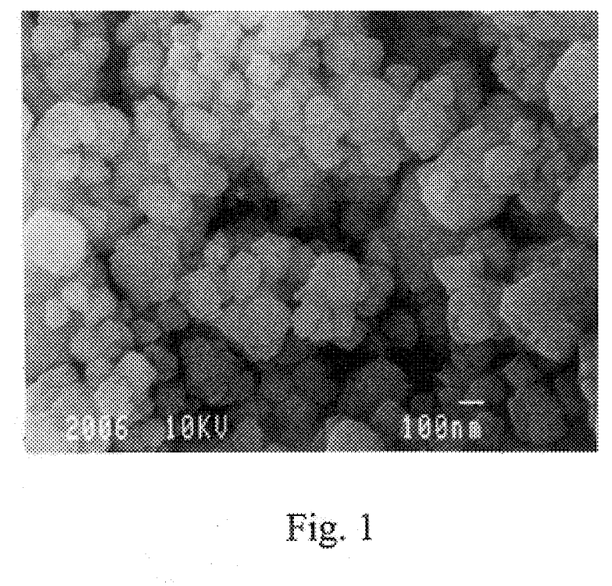
FIG. 1 is an FE-SEM photograph showing the particle structure of the highly heat-resistant β-zeolite of Example 1.
Figure 2:
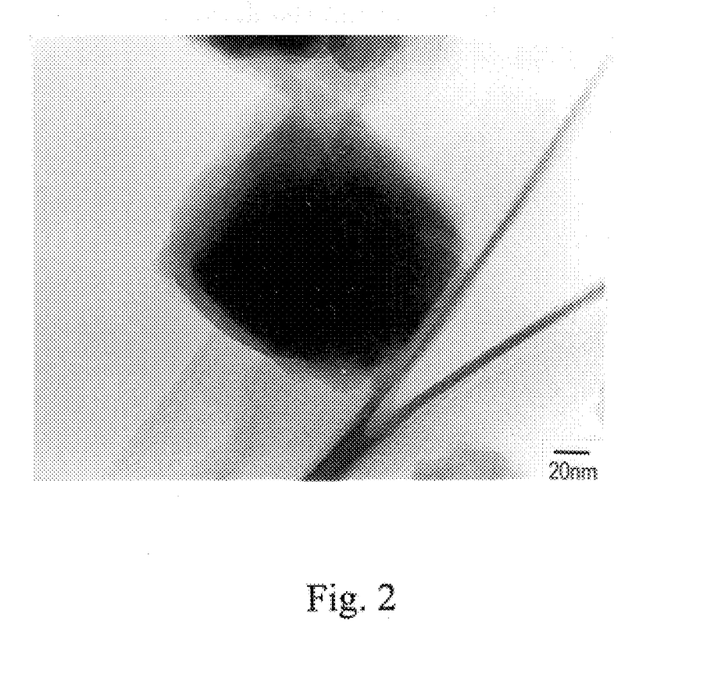
FIG. 2 is a TEM photograph showing the particle structure of the highly heat-resistant β-zeolite of Example 1.

In the highly heat-resistant β-zeolite of Example 1, the primary particles have an angular shape as seen in FIGS. 1 and 2 (Example 1).

Figure 4:
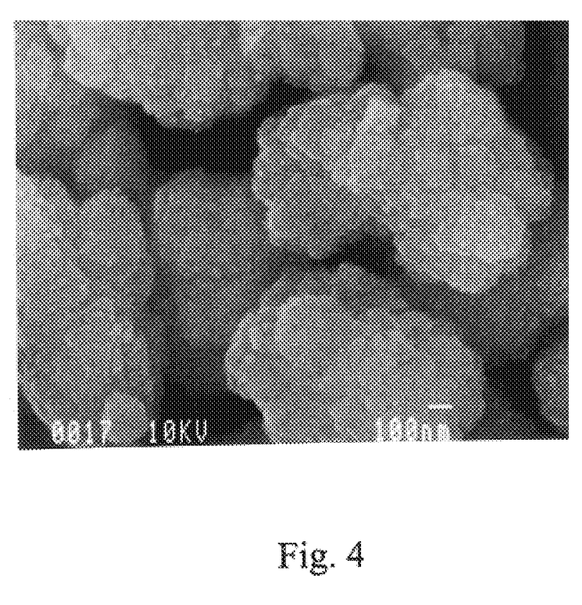
FIG. 4 is an FE-SEM photograph showing the particle structure of the highly heat-resistant β-zeolite of Example 2.
Figure 5:
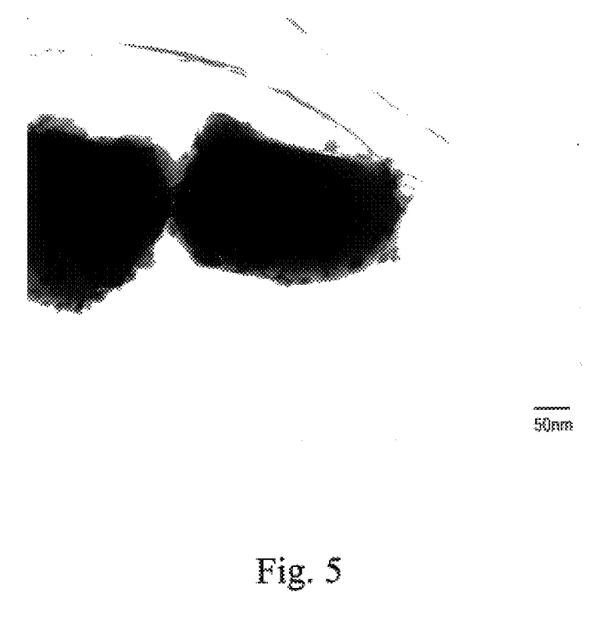
FIG. 5 is a TEM photograph showing the particle structure of the highly heat-resistant β-zeolite of Example 2.
Figure 6:
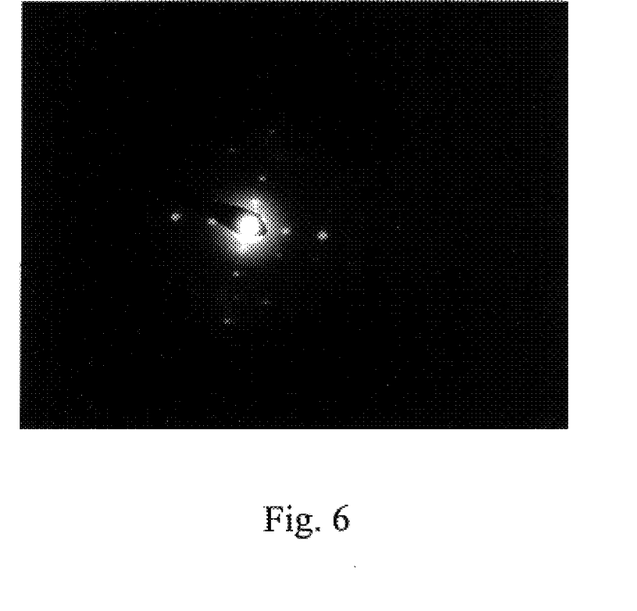
FIG. 6 is an electron diffraction photograph showing the particle structure of the highly heat-resistant β-zeolite of Example 2.
Figure 7:
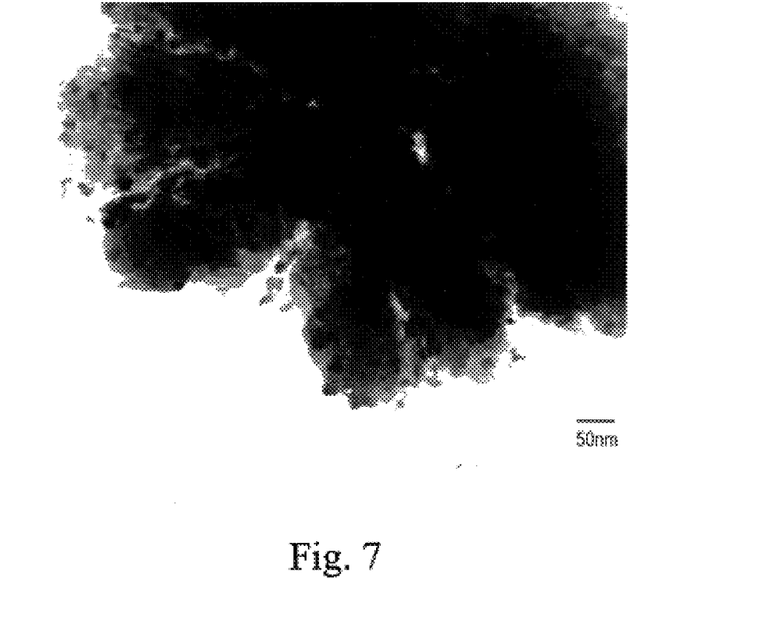
FIG. 7 is another view of the TEM photograph showing the particle structure of the highly heat-resistant β-zeolite of Example 2.
Figure 8:
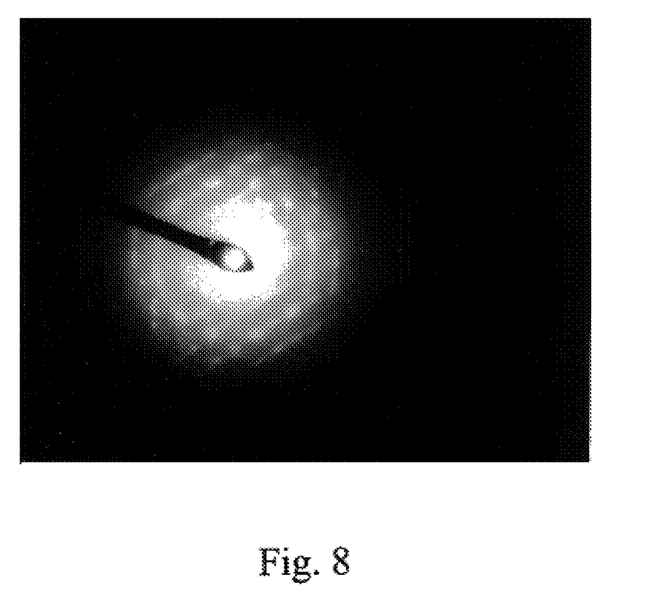
FIG. 8 is another view of the electron diffraction photograph showing the particle structure of the highly heat-resistant β-zeolite of Example 2.
Figure 9:
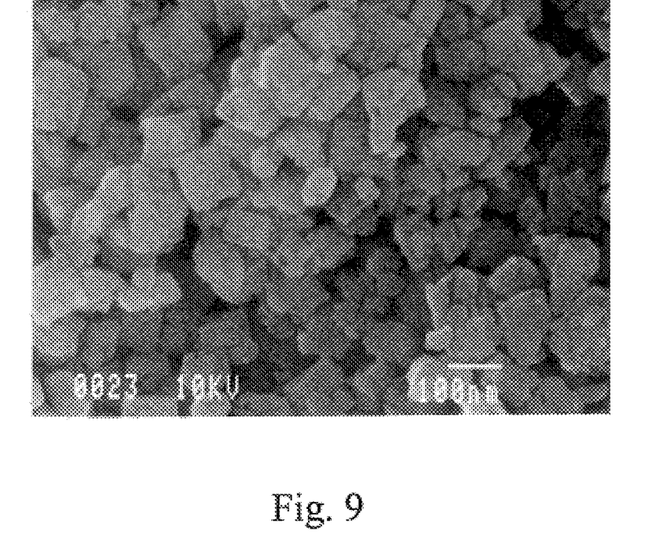
FIG. 9 is an FE-SEM photograph showing the particle structure of the highly heat-resistant β-zeolite of Example 4.
Figure 10:
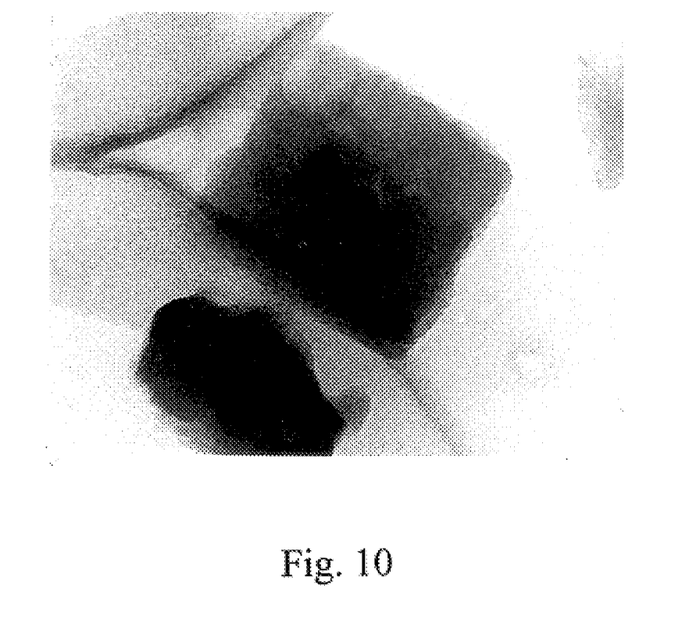
FIG. 10 is a TEM photograph showing the particle structure of the highly heat-resistant β-zeolite of Example 4.

The highly heat-resistant β-zeolite of Example 2 appears, from the FE-SEM photograph of FIG. 4, to be aggregated particles having a primary particle diameter of about 100 nm. However, since the electron diffraction image of whole particles of FIG. 6 shows a periodic regular pattern and a clear spot image, the particles shown in FIG. 5 are judged to be a single crystal. Further, the highly heat-resistant β-zeolite of Example 2 appears, from the electron diffraction image of FIG. 8, to be aggregated particles as in FIG. 4; however, the particles of FIG. 7 are judged to be constituted by primary particles having particle diameters of about 100 to 300 nm.

Figure 11:
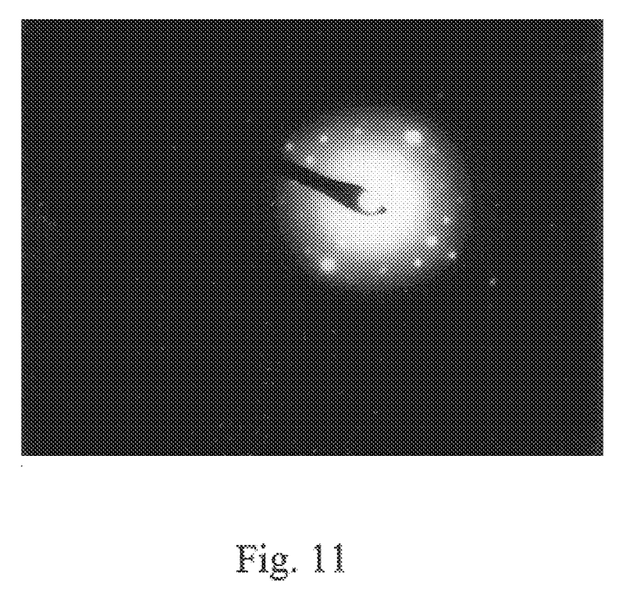
FIG. 11 is an electron diffraction photograph showing the particle structure of the highly heat-resistant β-zeolite of Example 4.

In the highly heat-resistant β-zeolite of Example 4, the electron diffraction image of whole particles shows a periodic regular pattern in FIG. 11 and, therefore, each particle observed is a primary particle (a single crystal). It was found that the particles have an angular shape as seen in the FE-SEM photograph of FIG. 9 and the TEM photograph of FIG. 10.

Figure 12:
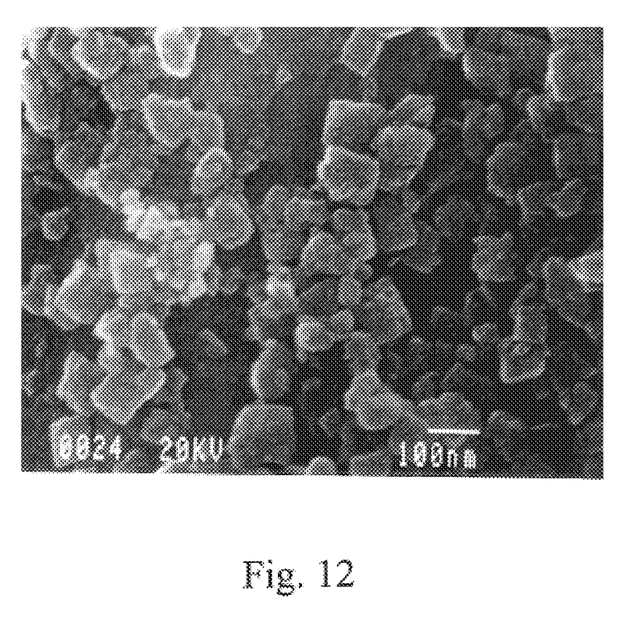
FIG. 12 is an FE-SEM photograph showing the particle structure of the highly heat-resistant β-zeolite of Example 5.
Figure 13:
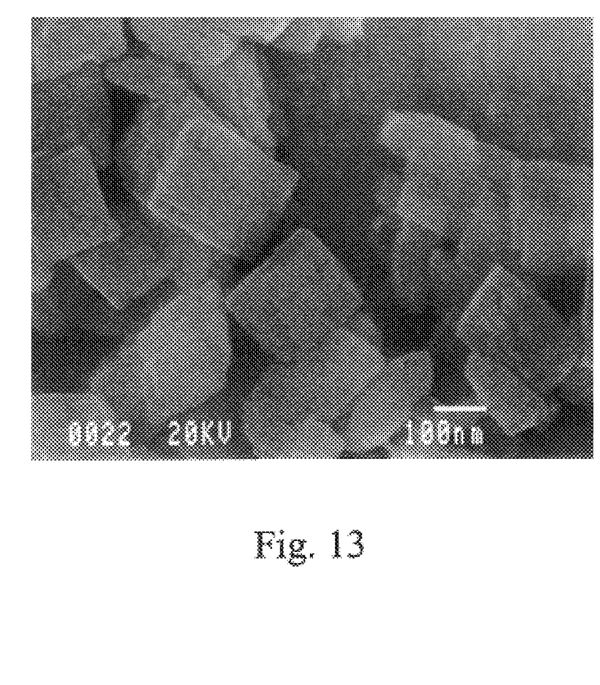
FIG. 13 is an FE-SEM photograph showing the particle structure of the highly heat-resistant β-zeolite of Example 6.
Figure 14:
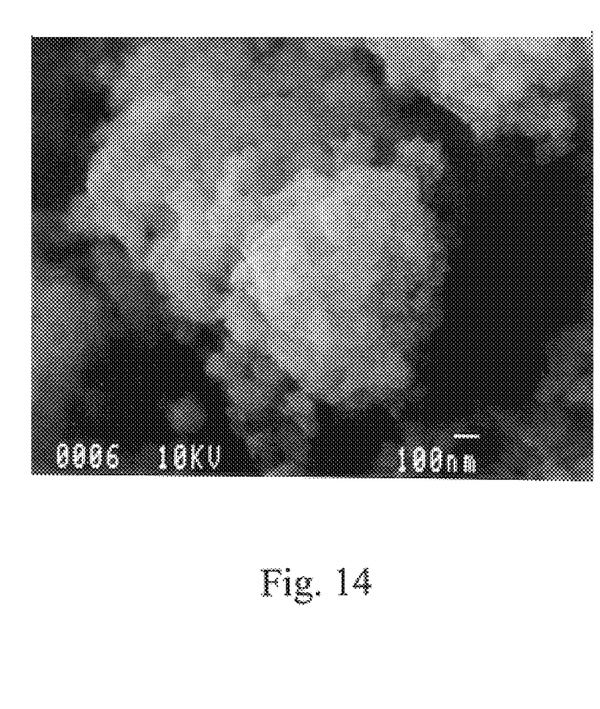
FIG. 14 is an FE-SEM photograph showing the particle structure of the highly heat-resistant β-zeolite of Comparative Example 1.
Figure 15:
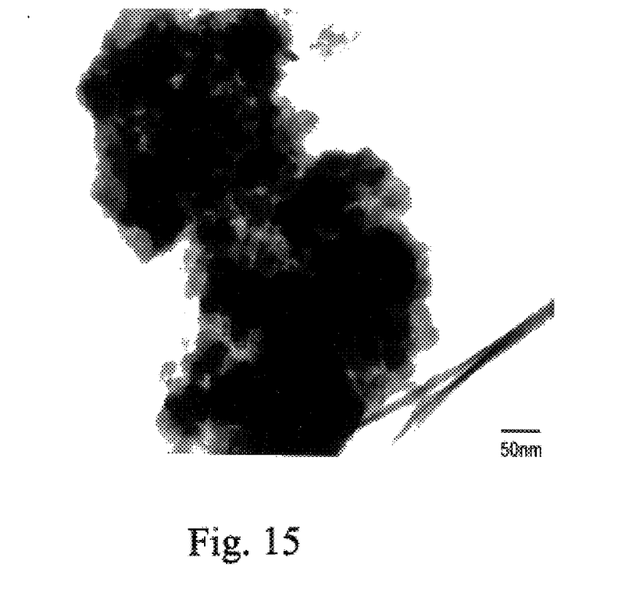
FIG. 15 is a TEM photograph showing the particle structure of the highly heat-resistant β-zeolite of Comparative Example 1.

Further, in the highly heat-resistant β-zeolite of Examples 5 and 6, the particles have an angular shape as seen in the FE-SEM photographs of FIGS. 11 and 12.

As is clear from the results of Table 2, the highly heat-resistant β-zeolites of Examples 1 to 6, as compared with the β-zeolites of Comparative Examples 1 to 2, are superior in heat resistance.

In the highly heat-resistant β-zeolites of Examples 1 to 2 and Examples 4–6, the particle size distribution is such that the 10% particle diameter is 20 nm or larger, as seen in the results of Table 1; and the full width at half maximum of reflection peak for (h,k,l)=(3,0,2) is 2θ=0.5° or smaller as seen in the results of Table 2.

As stated above, the highly heat-resistant β-zeolite of the present invention and the adsorbent for automobile exhaust gas purification, using said zeolite can be produced reliably so as to have guaranteed properties, by controlling the average particle size, particle size distribution, particle shape and crystal structure (these items are new yardsticks for determining the heat resistance of zeolite); and can suitably be used in applications where high heat resistance and high hydrothermal resistance are required, such as adsorption of hydrocarbons, exhaust gas purification system for an internal combustion engine (e.g. exhaust gas purification system of in-line type) and the like.

What is claimed is:

1. A β-zeolite powder having a $SiO_2/Al_2O_3$ ratio of 80 or more, which consists essentially of primary particles giving a full width at half maximum of reflection peak for (h,k,l)=(3,0,2) of 2θ=0.5° or smaller when the X-ray diffraction pattern is obtained from an X-ray diffractometer using Cu=Kα as the X-ray source, said powder having a specific surface area retention of at least 59% after exposure to a steam-containing atmosphere having a temperature of 1000° C. for 4 hours, wherein said primary particles have at least one angular portion.

2. The β-zeolite powder of claim 1, wherein the particle diameter of said primary particles is 100 nm or less, and the average particle diameter of said primary particles is 30 nm or more.

3. The β-zeolite powder of claim 1, wherein the average particle diameter of said primary particles is 50 nm or more.

4. The β-zeolite powder of claim 1, wherein the average particle diameter of said primary particles is 80 nm or more.

5. The β-zeolite powder of claim 1, wherein the average particle size distribution such that the 10% particle diameter is 20 nm or more.

6. The β-zeolite powder of claim 1, wherein said powder has a particle size distribution such that the 10% particle diameter is 40 nm or more.

7. An adsorbent for automobile exhaust gas purification, comprising the β-zeolite powder according to claim 1.

* * * * *

UNITED STATES PATENT AND TRADEMARK OFFICE
CERTIFICATE OF CORRECTION

PATENT NO. : 6,294,150 B2
DATED : September 25, 2001
INVENTOR(S) : Takahashi et al.

It is certified that error appears in the above-identified patent and that said Letters Patent is hereby corrected as shown below:

Title page,
Item [30], Foreign Application Priority Data, please add -- Oct. 30, 1998 (JP)............... 10-326134 --

Signed and Sealed this

Twenty-first Day of May, 2002

JAMES E. ROGAN
*Director of the United States Patent and Trademark Office*